United States Patent
Lyons et al.

(10) Patent No.: US 11,159,504 B2
(45) Date of Patent: *Oct. 26, 2021

(54) METHODS FOR AUTHENTICATING PHOTOGRAPHIC IMAGE DATA

(71) Applicant: TruePic Inc., La Jolla, CA (US)

(72) Inventors: Jason Lyons, Arlington, VA (US);
Craig Stack, La Jolla, CA (US);
Francis Lyons, Purcellville, VA (US);
Jeffrey McGregor, Palm Springs, CA (US)

(73) Assignee: TruePic Inc., La Jolla, CA (US)

( * ) Notice: Subject to any disclaimer, the term of this patent is extended or adjusted under 35 U.S.C. 154(b) by 16 days.

This patent is subject to a terminal disclaimer.

(21) Appl. No.: 16/531,620

(22) Filed: Aug. 5, 2019

(65) Prior Publication Data
US 2019/0356644 A1 Nov. 21, 2019

Related U.S. Application Data

(63) Continuation of application No. 15/728,869, filed on Oct. 10, 2017, now Pat. No. 10,375,050.

(51) Int. Cl.
*H04L 29/06* (2006.01)
*H04L 9/32* (2006.01)
(Continued)

(52) U.S. Cl.
CPC ............ *H04L 63/08* (2013.01); *G06F 21/645* (2013.01); *H04L 9/0643* (2013.01);
(Continued)

(58) Field of Classification Search
CPC ... H04L 9/0643; H04L 9/3297; H04L 9/3236; H04L 9/3242; H04L 63/08; H04L 63/123; H04W 12/06; G06F 21/645
(Continued)

(56) References Cited

U.S. PATENT DOCUMENTS

| 5,351,134 A | 9/1994 | Yaguchi |
| 5,499,294 A * | 3/1996 | Friedman ............... H04L 9/3236 713/179 |

(Continued)

FOREIGN PATENT DOCUMENTS

| CN | 101258744 A | 9/2008 |
| CN | 102687159 A | 9/2012 |

(Continued)

OTHER PUBLICATIONS

Chinese Patent Application No. 201680057888.X, Office Action dated Aug. 5, 2020, 9 pages.

(Continued)

*Primary Examiner* — Benjamin A Kaplan
(74) *Attorney, Agent, or Firm* — Sheppard Mullin Richter & Hampton LLP

(57) ABSTRACT

Systems and methods are provided for authenticating image files when network connections should not or cannot be used to transfer image files. A user device application may capture an image at a user device, generate an image file, and generate a hash file based on the image file. Instead of sending the image file to an authentication server for authentication, the application may send the hash file. If desired, the application may transfer the image file when a desirable network connection is available. Any alteration to the image file in the meantime will result in a different hash file for the altered image file, thus allowing detection of altered image files. This approach offers decreases the amount of data that is required to be transmitted in low or undesirable signal conditions, while maintaining an ability to detect alterations to image files that may have been made in the meantime.

22 Claims, 6 Drawing Sheets

(51) Int. Cl.
*G06F 21/64* (2013.01)
*H04L 9/06* (2006.01)
*H04W 12/06* (2021.01)

(52) U.S. Cl.
CPC .......... *H04L 9/3236* (2013.01); *H04L 9/3242* (2013.01); *H04L 9/3297* (2013.01); *H04L 63/123* (2013.01); *H04W 12/06* (2013.01)

(58) Field of Classification Search
USPC .......................................................... 726/7
See application file for complete search history.

(56) References Cited

U.S. PATENT DOCUMENTS

| | | |
|---|---|---|
| 6,411,725 B1 | 6/2002 | Rhoads |
| 6,487,301 B1 | 11/2002 | Zhao |
| 6,557,102 B1 | 4/2003 | Wong |
| 6,628,417 B1 | 9/2003 | Naito |
| 6,823,075 B2 | 11/2004 | Perry |
| 6,947,571 B1 | 9/2005 | Rhoads |
| 7,209,571 B2 | 4/2007 | Davis |
| 7,277,576 B2 | 10/2007 | Abbate |
| 7,616,777 B2 | 11/2009 | Rodriguez |
| 8,121,342 B2 | 2/2012 | Davis |
| 8,413,882 B1 | 4/2013 | Nidamarthi |
| 8,443,001 B2 | 5/2013 | Nichols |
| 8,849,819 B2 | 9/2014 | Johnson |
| 8,868,039 B2 | 10/2014 | Rodriguez |
| 8,879,120 B2 | 11/2014 | Thrasher |
| 8,955,137 B2 | 2/2015 | Mousty |
| 9,002,719 B2 | 4/2015 | Tofte |
| 9,082,235 B2 | 7/2015 | Lau |
| 9,300,678 B1 | 3/2016 | Stack |
| 9,594,980 B1 | 3/2017 | Graham |
| 9,609,288 B1 | 3/2017 | Richman |
| 9,614,886 B2 | 4/2017 | Zhong |
| 9,621,565 B2 | 4/2017 | Stack |
| 9,652,460 B1 | 5/2017 | Barisic |
| 9,832,017 B2 | 11/2017 | Malone |
| 10,013,568 B2 | 7/2018 | Mityagin |
| 10,095,877 B2 | 10/2018 | Stack |
| 10,255,419 B1 | 4/2019 | Kragh |
| 10,360,668 B1 | 7/2019 | McGregor |
| 10,361,866 B1 | 7/2019 | McGregor |
| 10,375,050 B2 | 8/2019 | Lyons |
| 10,389,733 B2 | 8/2019 | Fasoli |
| 2003/0065922 A1 | 4/2003 | Fredlund |
| 2004/0039912 A1 | 2/2004 | Borrowman |
| 2004/0091111 A1 | 5/2004 | Levy |
| 2004/0153649 A1 | 8/2004 | Rhoads |
| 2004/0213437 A1 | 10/2004 | Howard, V |
| 2005/0273368 A1 | 12/2005 | Hutten |
| 2006/0018506 A1 | 1/2006 | Rodriguez |
| 2006/0036864 A1 | 2/2006 | Parulski |
| 2006/0115111 A1 | 6/2006 | Malone |
| 2006/0120562 A1 | 6/2006 | Fudge |
| 2006/0157559 A1 | 7/2006 | Levy |
| 2006/0262976 A1 | 11/2006 | Hart |
| 2007/0019836 A1 | 1/2007 | Thorwirth |
| 2007/0091376 A1 | 4/2007 | Calhoon |
| 2007/0162756 A1 | 7/2007 | Fredlund |
| 2007/0171288 A1 | 7/2007 | Inoue |
| 2008/0005086 A1 | 1/2008 | Moore |
| 2009/0044235 A1 | 2/2009 | Davidson |
| 2009/0320101 A1 | 12/2009 | Doyle |
| 2010/0046748 A1 | 2/2010 | Kusnoto |
| 2010/0250953 A1 | 9/2010 | Wiersma |
| 2010/0281475 A1 | 11/2010 | Jain |
| 2010/0317399 A1 | 12/2010 | Rodriguez |
| 2011/0087690 A1 | 4/2011 | Cairns |
| 2011/0156879 A1 | 6/2011 | Matsushita |
| 2011/0221568 A1* | 9/2011 | Giobbi ................ H04L 63/0861 340/5.82 |
| 2011/0231645 A1 | 9/2011 | Thomas |
| 2011/0258326 A1 | 10/2011 | Hu |
| 2012/0004949 A1 | 1/2012 | Coleman |
| 2012/0143630 A1 | 6/2012 | Hertenstein |
| 2012/0278370 A1 | 11/2012 | Nichols |
| 2012/0311623 A1 | 12/2012 | Davis |
| 2013/0041948 A1 | 2/2013 | Tseng |
| 2014/0049653 A1 | 2/2014 | Leonard |
| 2014/0081932 A1 | 3/2014 | Krislov |
| 2014/0198687 A1 | 7/2014 | Raleigh |
| 2014/0244781 A1 | 8/2014 | Klayko |
| 2014/0279493 A1 | 9/2014 | Kamath |
| 2014/0297810 A1 | 10/2014 | Zhong |
| 2014/0324986 A1 | 10/2014 | Zhang |
| 2014/0358964 A1 | 12/2014 | Woods |
| 2015/0016661 A1 | 1/2015 | Lord |
| 2015/0142595 A1 | 5/2015 | Acuna-Rohter |
| 2015/0154436 A1 | 6/2015 | Shi |
| 2015/0213324 A1 | 7/2015 | Farid |
| 2015/0310306 A1 | 10/2015 | Song |
| 2016/0162729 A1 | 6/2016 | Hagen |
| 2016/0379330 A1 | 12/2016 | Powers |
| 2017/0041306 A1 | 2/2017 | Stack |
| 2017/0041328 A1 | 2/2017 | Stack |
| 2017/0048216 A1 | 2/2017 | Chow |
| 2017/0093867 A1 | 3/2017 | Burns |
| 2017/0118493 A1 | 4/2017 | Hain |
| 2017/0178058 A1 | 6/2017 | Bhat |
| 2017/0180277 A1 | 6/2017 | Brady |
| 2017/0193329 A1 | 7/2017 | Suman |
| 2017/0295232 A1 | 10/2017 | Curtis |
| 2017/0359326 A1* | 12/2017 | Garcia ................ H04W 12/08 |
| 2017/0373859 A1 | 12/2017 | Shors |
| 2017/0374622 A1 | 12/2017 | Visuri |
| 2018/0019873 A1* | 1/2018 | Kraemer ............... H04L 63/123 |
| 2018/0026932 A1 | 1/2018 | Wang |
| 2018/0260888 A1 | 9/2018 | Paolini-Subramanya |
| 2018/0365442 A1 | 12/2018 | Stack |
| 2019/0109834 A1 | 4/2019 | Lyons |
| 2019/0147305 A1 | 5/2019 | Lu |
| 2019/0164285 A1 | 5/2019 | Nye |
| 2019/0251349 A1 | 8/2019 | Duerksen |
| 2019/0391972 A1 | 12/2019 | Bates |
| 2020/0012806 A1 | 1/2020 | Bates |
| 2020/0126209 A1 | 4/2020 | Kim |
| 2020/0210768 A1 | 7/2020 | Turkelson |
| 2021/0004949 A1 | 1/2021 | Broydajuliy |

FOREIGN PATENT DOCUMENTS

| | | |
|---|---|---|
| CN | 104079830 A | 10/2014 |
| CN | 103345758 B | 8/2016 |
| WO | 0152178 | 7/2001 |
| WO | 0227431 A2 | 4/2002 |
| WO | 2015020601 | 2/2015 |
| WO | 2015020601 A1 | 2/2015 |
| WO | 2017023896 | 2/2017 |

OTHER PUBLICATIONS

Bhowmik, Deepayan et al., "The Multimedia Blockchain: A Distributed and Tamper-Proof Media Transaction Framework", Digital Signal Processing (DSP), 2017 22nd International Conference on IEEE, 2017, 6 pages (Year: 2017).

Drescher, Daniel, "Blockchain Basics: A Non-Technical Introduction in 25 Steps", 255 pages, APress, ISBN 978-1-4842-2603-2, 2017, 246 pages (Year: 2017).

European Patent Application No. 16833714.5, Supplementary European Search Report, dated Nov. 13, 2018, 7 pages.

International Patent Application No. PCT/US2016/045089, an International Search Report and Written Opinion issued by Authorized Officer Lee W. Young, dated Oct. 21, 2016, 8 pages.

International Patent Application No. PCT/US2018/053059, an International Search Report and Written Opinion issued by Authorized Officer Lee W. Young, dated Dec. 10, 2018, 13 pages.

The TCP/IP Guide, tcpipguide.com, 2005, pp. 1-4.

(56) References Cited

OTHER PUBLICATIONS

Bhowmik, Deepayan et al., "The Multimedia Blockchain: A Distributed and Tamper-Proof Media Transaction Framework", Digital Signal Processing (DSP), 2017 22nd International Conference on IEEE, Aug. 2017, 6 pages.
Drescher, Daniel, "Blockchain Basics: A Non-Technical Introduction in 25 Steps", A Press, copyright 2017, ISBN 978-1-4842-2603-2, 246 pages.
Cao, Hong, et al., "Identification of Recaptured Photographs on LCD Screens", IEEE, 978-1-4244-4296-6, 2010, (Year: 2010), pp. 1790-1793.
De Las Heras, Lluis-Pere, et al., Use Case Visual Bag-of-Words Techniques for Camera Based Identity Document Classification, 2015 13th International Conference on Document Analysis and Recognition (ICDAR), IEEE, 978-1-4799-1805-8/15, 2015, (Year: 2015), pp. 721-725.
Ke, Yongzhen, et al., "Image Recapture Detection Using Multiple Features", International Journal of Multimedia and Ubiquitous Engineering, vol. 8, No. 5. ISSN: 1975-0080 IJMUE, 2013 (Year: 2013), pp. 71-82.
Ng, Tian-Tsong, et al., "Discrimination of Computer Synthesized or Recaptured Images from Real Images", Springer, 10.1007/978-1-4614-0757-7_10, 2013, (Year: 2013), pp. 275-309.
Thongkamwitoon, Thirapiroon, et al., "An Image Recapture Detection Algorithm Based on Learning Dictionaries of Edge Profiles", IEEE Transactions on Information Forensics and Security, vol. 10, No. 5, May 2015, 10.1109/TIFS.2015.2392566, 2015, (Year: 2015), pp. 953-968.
Wang, Kai, "A Simple and Effective Image-Statistics-Based Approach to Detecting Recaptured Images from LCD Screens", Digital Investigation, vol. 23, Elsevier, 1742-2876,2017, (Year 2017), pp. 75-87.

\* cited by examiner

METHODS FOR AUTHENTICATING PHOTOGRAPHIC IMAGE DATA

CROSS-REFERENCE TO RELATED APPLICATIONS

This application is a continuation of U.S. patent application Ser. No. 15/728,869, entitled "METHODS FOR AUTHENTICATING PHOTOGRAPHIC IMAGE DATA", filed Oct. 10, 2017, the contents of which are hereby incorporated by reference in its entirety herein. This application is related to U.S. Pat. No. 10,095,877, filed on Mar. 9, 2016, entitled "SYSTEMS AND METHODS FOR AUTHENTICATING PHOTOGRAPHIC IMAGE DATA," which issued on Oct. 9, 2018; U.S. Pat. No. 9,300,678, filed on Aug. 3, 2015, entitled "SYSTEMS AND METHODS FOR AUTHENTICATING PHOTOGRAPHIC IMAGE DATA" which issued on Mar. 29, 2016; U.S. Pat. No. 9,621,565, filed on Nov. 16, 2015, entitled "SYSTEMS AND METHODS FOR AUTHENTICATING PHOTOGRAPHIC IMAGE DATA," which issued on Apr. 11, 2017; and PCT Application No. PCT/US16/45089, filed on Aug. 2, 2016, entitled "SYSTEMS AND METHODS FOR AUTHENTICATING PHOTOGRAPHIC IMAGE DATA;" which are all hereby incorporated by reference in their entireties.

TECHNICAL FIELD

The present disclosure relates to systems and methods for authenticating photographic image data, including a software application for controlling photography on a client device and metadata associated therewith and an authentication server for receiving data therefrom.

BACKGROUND OF THE INVENTION

Digital photography has grown steadily since its introduction. Social networks and mobile computing devices have further accelerated the growth of photographic data made available to the public. The ability to take and share photographs anytime and anywhere has resulted in the general public consuming more photographic data than ever and relying on these photographs for up to the minute information. However, it is a well-known fact that digital photographs are easily edited and the information contained within a digital photograph may not be entirely trustworthy.

U.S. Pat. No. 9,300,678, entitled "Systems and methods for authenticating photographic image data," which issued Mar. 29, 2016, the contents of which is incorporated by reference herein its entirety, discloses, in part, a software application that resides on a client device (e.g., a smart phone or other client device) for controlling various aspects of photography on the client device where authentication of photos is desired, an authentication server for receiving a photo and associated data therefrom and creating an authenticated photo and a website for storing the authenticated photos and which enables users who subsequently receive a copy of the photo to determine if it is an authentic photo. Collectively, the image authentication application and authentication server are configured to be operable to control the taking of photos to be authenticated and the association of metadata with those photos. The image authentication application may require users, desiring to generate an authenticated photo, to invoke the image authentication application to take a picture. The image authentication application and authentication server include functionality to reduce the likelihood of alteration of metadata associated with a picture taken under control of the application.

Once a picture is taken under control of the image authentication application, it is sent from the image authentication application to the authentication server. The image authentication application may prevent a photo that has been taken from being edited or sent from the image authentication application to any location other than the authentication server. This helps prevent alteration of the photo.

To take a picture the user may be required to open the image authentication application (if it is not already open on the device). After taking a picture using the image authentication application and selecting to use the photo, the image will be transmitted to the authentication server along with various metadata, such as geographic information, e.g., the user's current latitude/longitude, time data if desired and/or other metadata.

According to one aspect, the time at which the image is received by the server is recorded. This helps prevent alteration of the time metadata associated with the photo. In various prior approaches to photo authentication, the time data is generated solely by the client device. A problem with these prior approaches is that users can alter the system time of the client device.

In certain embodiments, the application may include a feature to ensure that the time delay between opening the application and/or taking a photo in the image authentication application and sending the image to the authentication server is within an approved time frame. Similarly, the image authentication application may include a feature to ensure that the location at which a photograph was taken is within an approved distance limitation from the location from which the user transmits the photograph to the authentication server.

According to another aspect, the authentication server performs various steps to facilitate authentication of photos received from the application. When a photo is received, the authentication server may assign it a unique resource locator (e.g., a unique web address). The authenticated image (or a version of the authenticated image), and associated metadata, is stored on the authentication server. The unique resource locator (e.g., a web address or a web address proxy such as a bitly code or a tinyURL) may be provided along with the authenticated image for third party verification of the image. The website (and/or other distribution infrastructure) will allow third parties to check and reference the authenticated image to verify that it is authentic. The authentication server may host and/or be in communication with the website. Any third party can visit the authentication server website to look up the authenticated image they have been provided and to make sure that the picture they are viewing is also on the website. This insures that the image provided to the third party viewer has, in fact, been authenticated by the authentication server.

This approach has many advantages. However, it may present certain challenges when the user does not have a strong data connection at the time a picture is captured. It may also be less than desirable if the user must transmit a large file (e.g., a video file) over cellular network, particularly when the data rate is relatively expensive. Other network issues may also present challenges.

SUMMARY OF THE INVENTION

The invention addresses these and other potential challenges with prior approaches.

According to one aspect, the invention provides a solution to at least some of these issues by transferring a short, fixed length hash file at the time of capture, instead of immediately sending the image file. If desired, the application may transfer the full image or video file when a desirable (e.g., strong WiFi or acceptable cellular) connection is available. The file hash can be a relatively small file (e.g., less than 1 kB or other desired size) relative to photos and/or video which can exceed 10 MB or more. This approach offers a significant decrease in the amount of data that is required to be transmitted in low or undesirable signal conditions.

According to one aspect, the software application may be configured to operate as follows. The software is invoked to capture an image (e.g., still image, video image, etc.) on a device and create an image file (e.g., photograph file, video file, etc.) and capture desired metadata (e.g., user ID, latitude, longitude). The application then creates a hash of the image file. The application then transmits the metadata and the hash of the contents of the image file to the authentication server, without sending the image file.

Upon receipt, the authentication server creates a temporary record containing the hash value provided, the user ID, lat/long AND the timestamp that this request reaches the server.

When the user device has access to a desirable network connection (e.g., reaches a WIFI or strong cellular connection) the full image/video file may be transferred to the authentication server. The authentication server then hashes this data file using the same algorithm that was used on the device to create the hash. The authentication server then compares this hash to the hash stored in the temporary records and if it matches associates the image/video file with the corresponding record.

Alternatively, the application may send to the authentication server only the file hash and not the actual image file. The authentication server can store the hash and later use this, if necessary, to authenticate an image file. This can be useful in high security or high situations where it is not desirable to have a copy of the image or video content available on a networked authentication server, but for which authentication may be desired. In these cases, the hashes stored on the authentication server can be user to later validate content.

The application may determine whether to transmit a hash file or an image file based on a characteristic of an available network connection. The characteristic may include a type and/or quality of a network connection available at the time of capturing the image. For example, the user may wish for image files to be sent only via certain types of network connections (e.g., WiFi connections) but not others (e.g. cellular network connections). In this instance, the application may send the hash file if the user device is connected via a cellular network connection, but send the image file if the user device is connected via a WiFi connection. Alternatively or additionally, the application may assess a quality of the network connection and, if the quality does not exceed a threshold quality level, the application may determine that a hash file should be sent instead of the image file. Later, if a WiFi connection becomes available and/or if the network connection quality improves, the application may send the image file.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The drawings are provided for purposes of illustration only and merely depict typical or example implementations. These drawings are provided to facilitate the reader's understanding and shall not be considered limiting of the breadth, scope, or applicability of the disclosure. For clarity and ease of illustration, these drawings are not necessarily drawn to scale.

DETAILED DESCRIPTION

According to one aspect, the invention provides a solution to at least some of these issues by transferring a short, fixed length hash file at the time of capture, instead of immediately sending the image file. If desired, the application may transfer the full image or video file when a desirable (e.g., strong wifi or acceptable cellular) connection is available. The file hash can be a relatively small file (e.g., less than 1 kB or other desired size) relative to photos and/or video which can exceed 10 MB or more. This approach offers a significant decrease in the amount of data that is required to be transmitted in low or undesirable signal conditions.

Figure 1:
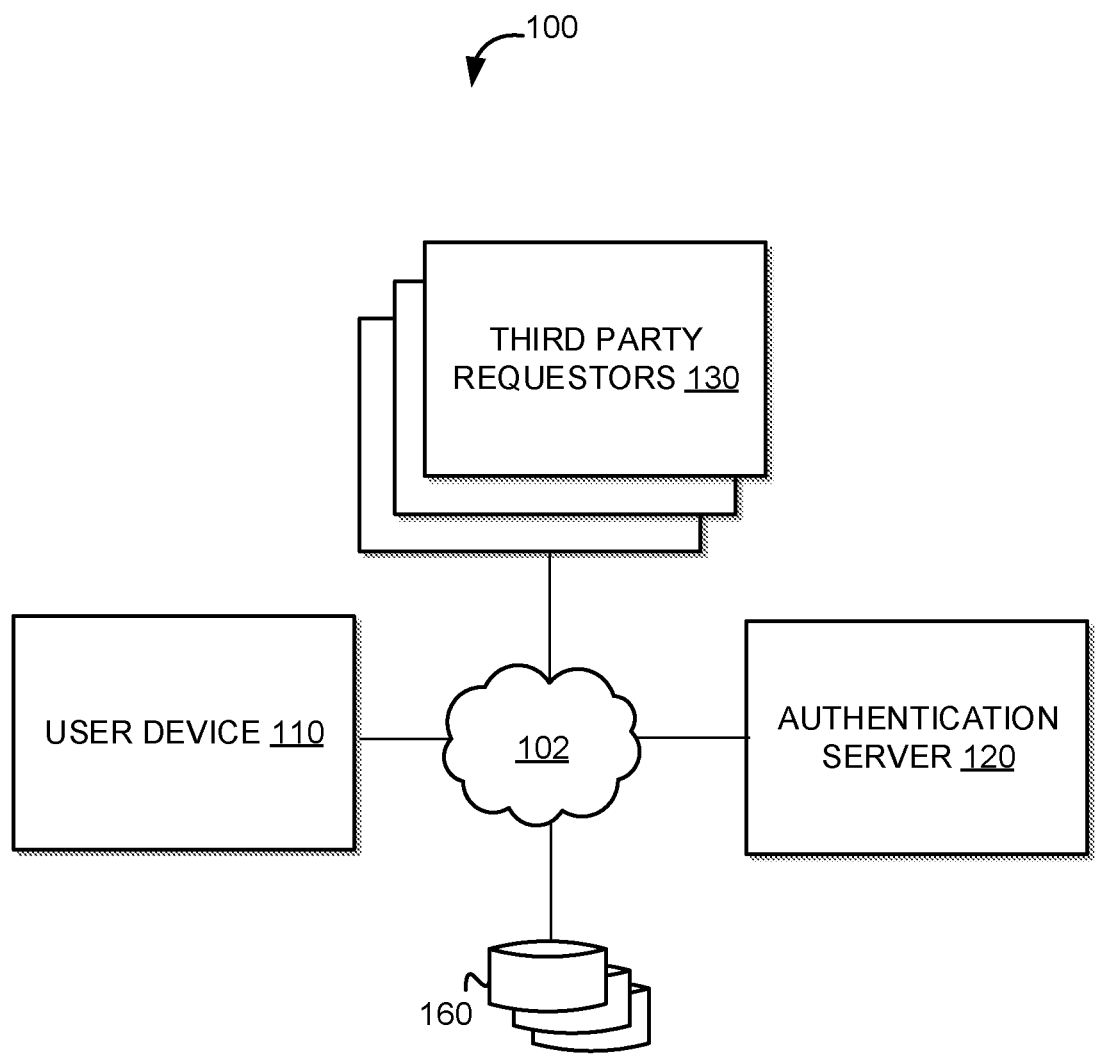
FIG. 1 illustrates a system for capturing an image at a device to be authenticated in conjunction with an authentication server accessible to the device via a network communication, according to an implementation of the invention.

FIG. 1 illustrates a system 100 for capturing an image at a device to be authenticated in conjunction with an authentication server accessible to the device via a network communication, according to an implementation of the invention. System 100 may include a user device 110, an authentication server 120, third party requesters 130, a database 140, and/or other components. The components of system 110 may be in communication with one another via a network 102.

Figure 2:
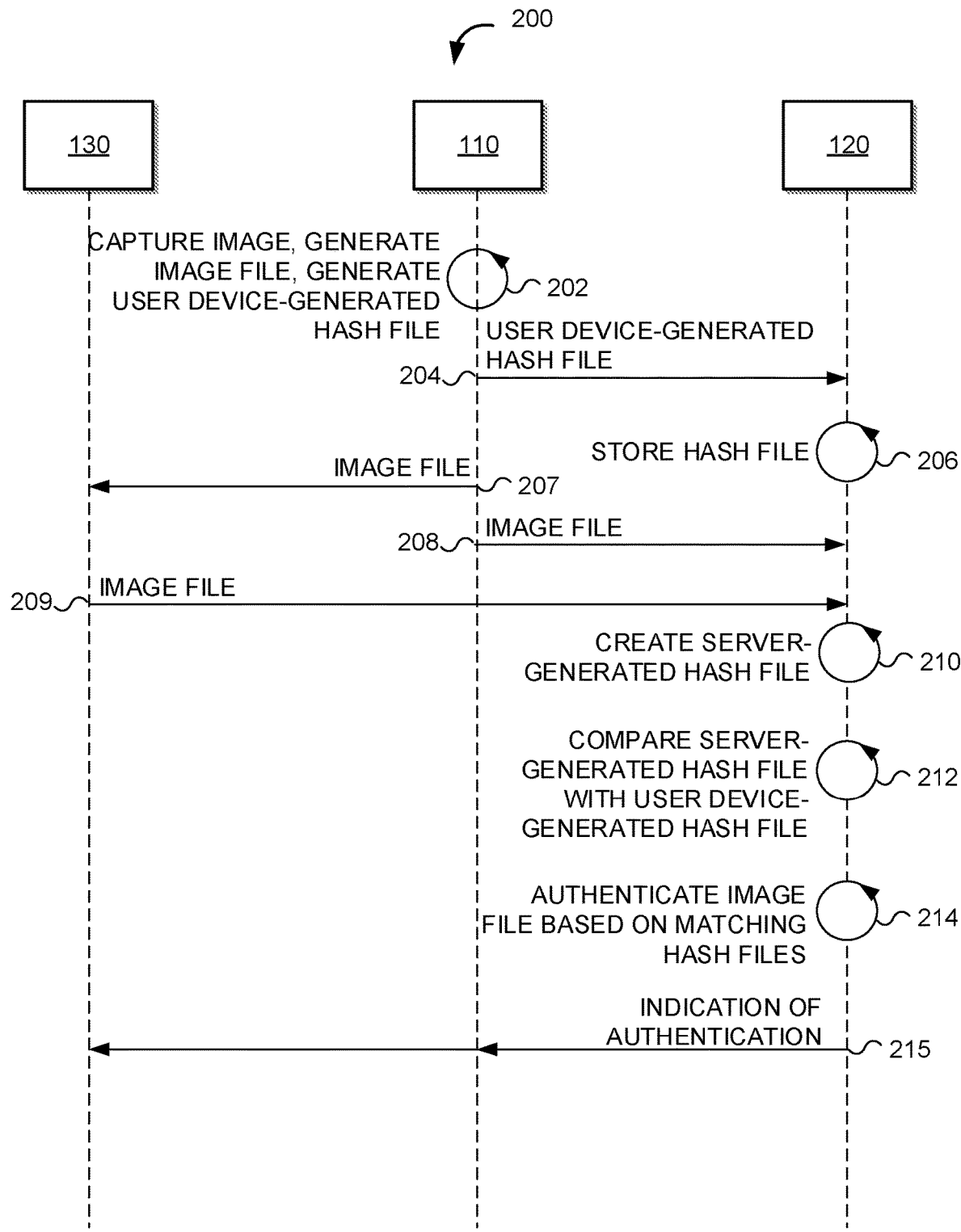
FIG. 2 illustrates a process for capturing an image at a device to be authenticated in conjunction with an authentication server accessible to the device via a network communication, according to an implementation of the invention.

Referring to FIG. 2, which illustrates a process for capturing an image at a device to be authenticated in conjunction with an authentication server accessible to the device via a network communication, in an operation 202, user device 110 may capture an image, generate an image file based on the captured image, generate a hash file based on a hash of the image file, and obtain metadata related to the image file.

In an operation 204, the user device 110 may transmit the hash file and information identifying the image file to the authentication server 120 without transmitting the image file at a first time. In some instances, the user device 110 may transmit the metadata to the authentication server 120 with the hash file and the information identifying the image file.

In an operation 206, the authentication server 120 may receive the hash file and the information identifying the image file and store them in association with one another, such as in a database 140. In this manner, the authentication server 120 may later retrieve a corresponding hash file based on the information identifying the image file.

In an operation 208, the client user device 110 may transmit the image file (along with information identifying the image file) to the authentication server 120 after the hash file and the information identifying the image file was transmitted.

In an operation 210, the authentication server 120 may receive the image file from the user device 110, and generate its own hash file based on a hash of the image file. The authentication server 120 may use the same hash function used by the user device 110 to generate its hash files.

In an operation 212, the authentication server 120 may compare the server-generated hash file with the user device-generated hash file (the hash file received from the user device 110). If the server-generated hash file matches the user device-generated hash file, the authentication server 120 may determine that the image file has not been tampered with. This is because any such tampering will result in non-matching hash files. As would be appreciated, whether or not two hash files match may be determined based on conventional file comparison techniques, such as executing a compare or diff function on the two files. Alternatively, upon receipt of the image file the authentication server 120 may store the image file in association with the information identifying the image file and the hash file received from the user device 110 for later authentication (e.g., in response to a request for authentication).

In an operation 214, in response to determining that the server-generated hash file matches the user device-generated hash file, the authentication server 120 may authenticate the image file by applying a watermark to it, storing an indication in database 140 that the image file has been authenticated, and/or take other actions to indicate that the image file is authentic.

Operations 207 and 209 may be executed instead of or in addition to operation 208. In an operation 207, the user device 110 may provide the image file and the information identifying the image file to a third party requester 130. In an operation 209, the third party requester 130 may provide the image file and information identifying the image file to authentication server 120 for authentication. For example, the third party requester 130 may wish to authenticate an image file provided from the user device 110. The authentication server 120 may receive a request to authenticate an image file from a third party requester 130 (e.g., not from the user device 110), where the request includes an image file to be authenticated and the information identifying the image file. In these implementations, the image file from the third party requester 130 is purportedly the same as the image file from which the user device-generated hash file is based. In other words, if a server-generated hash file of the image file from the third party requestor 130 matches the user device-generated hash file, then the image file from the third party requestor has not been tampered with (and is the same image file—i.e., copy—as the image file that was used to generate the user device-generated hash). In an operation 215, the image authentication server 120 may provide an indication of authentication to the user device 110 and/or the third party requester 130 as appropriate. Such indication may include the image file, authentication information (including results of the hash file comparison, the hash file output, a watermark, etc.), and/or other information indicating that the image file has been authenticated by the authentication server 120.

Having addressed an overview of implementations of the system, attention will now be turned to the user device 110 and authentication server 120.

User Device 110

Figure 3:
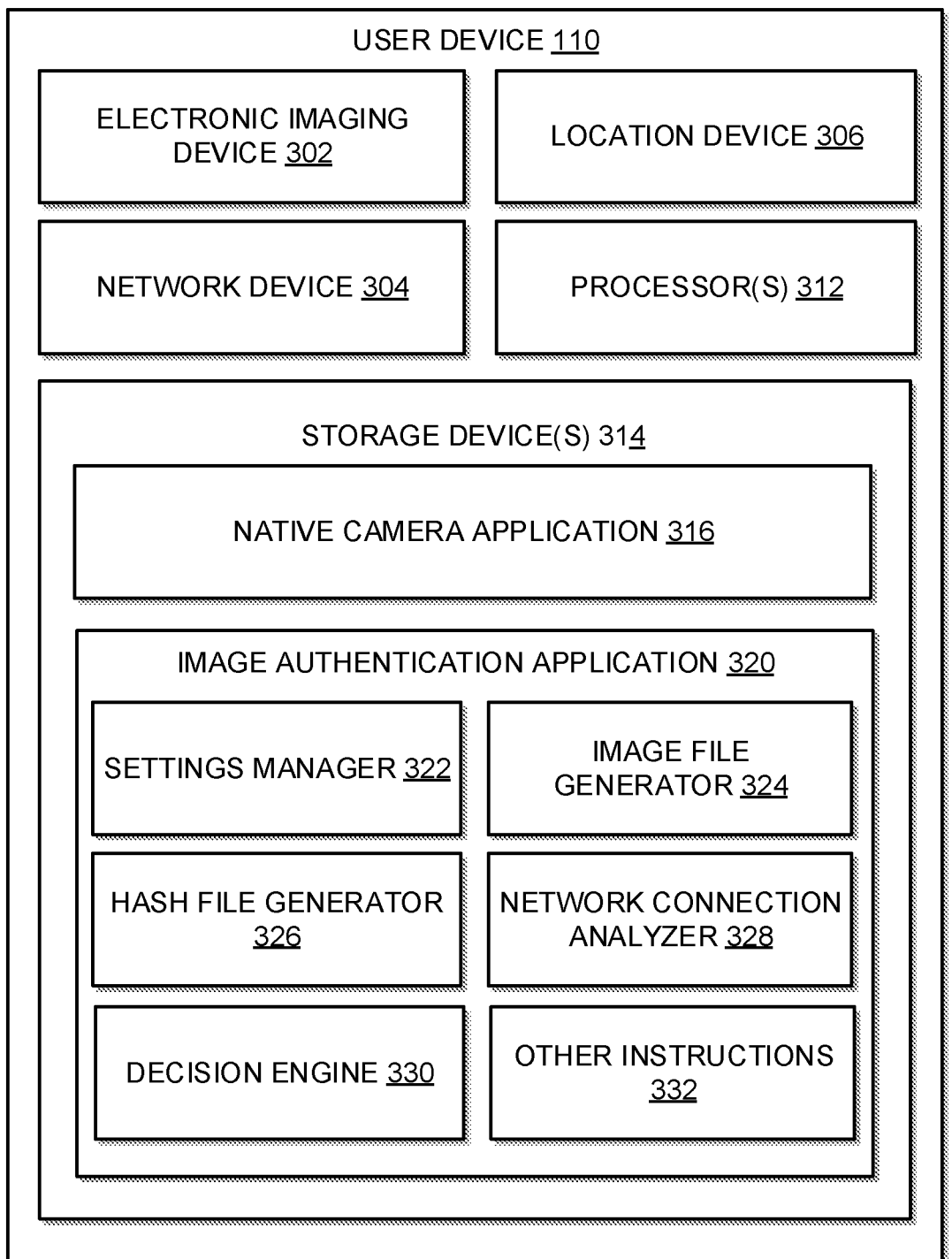
FIG. 3 illustrates a device for authenticating image files, captured at the device, in conjunction with an authentication server, in accordance with an embodiment of the present disclosure.

In an implementation, user device 110 may include any device capable of capturing images including, but not limited to, cell phones, smart phones, tablet computers, laptop computers, digital cameras, web cameras, laptop computers, desktop computers, security cameras, televisions, monitors, and the like. Referring to FIG. 3, which illustrates a device for authenticating image files, captured at the device, in conjunction with an authentication server, user device 110 may include an electronic imaging device 302, one or more network devices 304, location device 306, one or more processors 312, one or more electronic storage devices 314, and/or other components.

When a user wishes to take an image to be authenticated, the user opens the image authentication application 320 on the user device 110 to capture an image. When it is opened, the image authentication application 320 may record the time that the image authentication application is opened, the geographic location of the client device at the time the image authentication application is opened, and/or other information relevant to capturing images using the image authentication application. The foregoing and other information may be used later as metadata for authentication. Once the user captures an image using the image authentication application 320, the image authentication application may generate an image file based on the captured image and may assess an available network connection to determine whether the image file may be transmitted via the available network connection. The image authentication application 320 may obtain time, location, and/or other metadata at the time of image capture. Alternatively, prior to allowing the user to capture the image, the image authentication application 320 may assess an available network connection (or determine that no network connection is available). In this instance, the image authentication application 320 may not permit the user to capture an image if no network connection is available (or if an available network connection is available but should not be used for various reasons described herein).

In some instances, the image authentication application 320 may receive a request from the user to send the image file for authentication in response to which it may determine one or more characteristics of an available network connection and determine that the image file should not be sent via the network connection. In these instances, the image authentication application 320 may take one or more steps to confirm that the user has not had the opportunity to edit the image file by ensuring that certain time and/or geographic restrictions are satisfied. For example, the image authentication application 320 may note the time at which the image authentication application was opened, and the time at which the request to transmit the image file is made. If the request to transmit the image file is made sufficiently soon after the image authentication application is opened (for example, within one minute or other threshold time), then the image authentication application may authorize further operations to send the image file to proceed. Otherwise, the request to transmit the image file may be denied and the image file may be deleted or marked as unauthenticated. The image authentication application 320 may use other data for such verification as well or instead of time information. For example, the image authentication application 320 may compare the geographic location of the user device 110 at the time the image authentication application was opened and the geographic location of the device at the time the user requests transmission of the image file to the authentication server 120 to ensure that the user has not moved a great distance (e.g., less than 200 feet or other threshold distance value). Otherwise, the request to transmit the image file may be denied and the image file may be deleted or marked as unauthenticated. The foregoing time and geographic requirements help to ensure that the user has not had sufficient time to edit the image file.

Additional restrictions may be placed by the image authentication application 320 to assist in this authentication process. For example, the image authentication application 320 may only allow images taken within the image authentication application 320 to be transmitted to the authentication server 120. The image authentication application 320 may also prohibit the use of any editing tools within the image authentication application 320, or to prohibit exporting of image files so that the user cannot export image files to another program for editing. In this way, the image authentication application 320 ensures that the image file has remained within the approved application environment for the entirety of the image file's existence, and that the user has not been given the opportunity to revise any portion of the image file, including the image itself or the associated metadata.

In implementations that use the foregoing and other restrictions, once the image authentication application 320 has confirmed that the image file satisfies such restrictions, it may generate a hash file based on the image file and send the hash file to the authentication server 120. When the available network connection improves and/or another network connection becomes available, the image authentication application 320 may send the image file. Metadata (e.g., time and location data) associated with the image file may be sent along with the hash file and/or the image file. The authentication server 120 performs various tasks to authenticate the image file, including storing the hash file in association with the identifying information.

When a copy of the image file is received from the user device 110, the authentication server 120 may generate a server-generated hash file based on the copy, and compare the server-generated hash file with the user device-generated hash file. A match between the server-generated hash file and the user device-generated hash file may indicate that the copy of the image file has not been tampered with or altered since the original copy was created (because the user device-generated hash file was generated by the image authentication application 320 on the original). Upon authentication the authentication server 120 may apply a watermark and/or provide another indication that the image file has been authenticated.

Electronic imaging device 302 may include an electronic image sensor configured to detect and convey information used to generate an image. For example, electronic imaging device 302 may include, without limitation, a charge coupled device ("CCD") sensor, a complementary metal-oxide-semiconductor ("CMOS") sensor, and/or other type of device configured to detect and convey information used to generate an image. The image may include a still image (e.g., a photograph), a video image, and/or other types of images.

Network device 304 may include a network interface device configured to connect to and transmit data over a network, such as network 102 (illustrated in FIG. 1). In some implementations, user device 110 may include a network device 304 for each of different types of network connections that may be available. For example, and without limitation, one network device 304 may be configured to connect to a cellular data connection (e.g., "3G/4G/5G/etc.") provided through a wireless service provider, while another network device 304 may be configured to connect to a Wireless Fidelity "WiFi") connection using a IEEE 802.XX or other specification. Other types of network connections through which communication with authentication server 130 across a network may be used as well. In some implementations, a single network device 304 may be configured to connect to multiple types of network connections as well.

Location device 306 may include a device configured to detect information used identify a physical (e.g., geographic) location of the location device. For example, and without limitation, location device 306 may include a Global Positioning System ("GPS") sensor device, a WiFi device (for obtaining hotspot location information), a network device (for obtaining IP address-based physical locations), and/or other type of location device configured to produce information used to identify a physical location of the location device 306 (and therefore the user device 110).

In an implementation, the one or more processors 312 may be programmed by computer program instructions, such as those stored in the one or more electronic storage devices 314. For example, the one or more processors 312 may be programmed by, among other instructions, a native camera application 316 and an image authentication application 320. The native camera application 316 may be an executable application, which is a different executable application than the image authentication application 320, that captures images using electronic imaging device 302. Native camera application 316 typically stores image files it generates in an accessible file location, such as a camera directory that is readable using an image album application. From the accessible file location, such image files are readily accessed and able to be edited. To help prevent such open access and editing functions, image authentication application 320 may be configured with its own image capture and storage functionality, as described herein.

In an implementation, image authentication application 320 may include various instructions such as, without limitation, a settings manager 322, an image file generator 324, a hash file generator 326, a network connection analyzer 328, a decision engine 330, and/or other instructions. As used herein, for convenience, the various instructions will be described as performing an operation, when, in fact, the various instructions program the processors 312 (and therefore user device 110) to perform the operation.

User-Defined Settings and System Rules that Control Operation of the Image Authentication Application The settings manager 322 may obtain, from a user, one or more user-defined settings to be applied to operation of the image authentication application 330. For example, the settings manager 322 may expose a user interface with input settings that allow a user to configure the behavior of the image authentication application 330. The user-defined settings may include, without limitation, a setting that indicates types of network connections in which image files should not be transferred, a setting that indicates types of network connections in which image files may be transferred, a setting that indicates a maximum file size permissible for an image file to be transferred, and/or other user-definable settings that control the behavior of the image authentication application 330.

The various settings may be combined or otherwise used in connection with one another. For example, a user may specify that image files should not be sent over a cellular data connection, but can be sent over a WiFi connection. The user may specify that image files over a certain size should not be sent over a cellular data connection. Other types of network connections may be specified as well or in the alternative. In some instances, a user setting may specify that image files should not be transmitted when an available network connection is of low quality (i.e., only when an available network connection is "strong"). Such "low quality" or "strong" quality may be measured based on, for example, network latency, network error rates, and/or other network metrics that may be measured to determine whether or not they meet certain quality thresholds (which may be specified by the user and/or predefined by the image authentication application 330). In some instances, the image authentication application 330 may decide (whether or not based on a user-defined setting) whether to send an image file based on the quality of an available network connection. For example, a predefined network metric threshold may be used to determine what is a "low quality" network connection and what is a "strong" network connection. It should be noted that a single quality metric need not be used. For instance, a combination of quality metrics may be used, weighted, and scored to generate an overall network quality score, which may be compared to an overall network quality threshold. The foregoing threshold values may be predefined by a user-defined setting and/or a system rule, discussed below.

In addition to or instead of the user-defined settings, the settings manager 322 may obtain predefined system rules that control operation of the image authentication application 330. The predefined system rules may include settings that are the same as the user-defined settings, but instead of being set by the user, the predefined system rules may be set by a developer or others who are not an end user of user device 110. In this sense, in some implementations, one or more of the system rules may provide default settings for corresponding ones of the user-defined settings. In other implementations, the system rules may prohibit any user-defined settings and require only the system rules to be used.

Capturing an Image and Generating an Image File

Using the electronic imaging device 302, image file generator 324 may capture an image and generate an image file. Depending on the type of image that is captured (e.g., photograph, video, etc.), image file generator 324 may encode the captured image into an image file according to an appropriate encoding technique (e.g., JPEG/PNG/etc. for photographs, MPEG/NTSC/etc. for videos, and so on). In some implementations, image file generator 324 may store the image file in a file location on the electronic storage device 114 such as a hidden file location. Such hidden file location may not be exposed to the user of user device 110, but is accessible to the image authentication application 330. For example, the hidden file location may be obfuscated from the user using native operating system hidden file directory techniques. Other file locations may be used as well.

Generating Hash Files

In some implementations, the hash file generator 326 may generate a hash file based on an image file. For example, the hash file generator 326 may generate a hash of the image file using a hash function and generate the hash file based on the hash. In some implementations, the hash function may map data from the image file into data of a fixed size, in which the fixed size (e.g., memory footprint) is smaller than size of the image file. In some instances, the fixed size is orders of magnitudes smaller than the size of the image file (depending on the size of the image file itself). The hash function may generate a deterministic hash according to the content of the image file. For example, using the hash function, a hash of the image file will be the same as the hash of a copy of the image file if the copy is not altered. On the other hand, using the hash function, a hash of the image file will be different than a hash of a copy of the image file that has been altered (and also different than a hash of another file altogether). Examples of hash functions that may be used include, without limitation, SHA-256 and SHA-512.

Assessing Network Characteristics

In an implementation, the network connection analyzer 328 may determine one or more characteristics of an available network connection. An available network connection is a network connection detected by, or can be established by, one or more of the network devices 304 has detected (e.g., a network connection in which the network devices 304 has detected broadcast network information from an access point associated with the network connection, a network connection in which communication with an access point associated with the network connection has been established, a network connection in which an initial handshake communication has been initiated with an access point associated with the network connection, etc.). The one or more characteristics may include, without limitation, a type of an available network connection, a quality of an available network connection, and/or other types of characteristics that describe an available network connection.

Types of Network Connections

In some implementations, the network connection analyzer 328 may determine types of available network connections. For instance, the network connection analyzer 328 may identify a type of network connection currently used to transmit data to or from the user device 110 via network 102. In some implementations, the network connection analyzer 328 may determine that a network device 304 for a cellular network has indicated that a cellular network connection is available (and/or is currently being used to transmit and/or receive data from the user device 110). Other types of network connections (e.g., WiFi connections) may similarly be made. In some instances, the types of available network connections may be obtained from the operating system of user device 110 and/or from an operating system of a network device 304 if so configured.

As will be described, the type of available network connection may be used by the decision engine 330 to determine whether or not to send a hash file of an image file and/or determine whether or not to send the image file.

Quality of Network Connections

In some implementations, the network connection analyzer 328 may determine the quality of one or more available network connections. The quality may be assessed based on one or more metrics that indicate a quality of an available network connection. The one or more metrics may include, without limitation, a signal strength indicator, a number of dropped packets, a ratio of received packets to dropped packets (or vice versa), a network latency, a network throughput, and/or other network quality metrics that can be used to assess a quality of an available network connection.

In some instances, the network connection analyzer 328 may determine a signal strength of an available network connection. The signal strength may be obtained from, for example, a measurement of a signal transmitted from an access point such as a cellular base station, a signal transmitted from WiFi router or other WiFi access point, a measurement from an access point of a signal transmitted from the user device 110 to the access point, and/or other signal measurement.

In some instances, the network connection analyzer 328 may determine a number of dropped packets from information exchanged between an access point (e.g., a cellular network base station, a WiFi router, etc.) and user device 110.

In some instances, the network connection analyzer 328 may obtain a number of dropped packets versus received packets and/or a ratio of the foregoing. For instance, the network connection analyzer 328 may obtain a burst error rate and/or other network transmission metric that determines a number or ratio of received packets and dropped packets.

In some instances, the network connection analyzer 328 may obtain a current throughput of the network connection available at the first time. In some instances, the throughput may be obtained based on network performance information exchanged between the user device 110 and an access point (e.g., using control channels). In some instances, the network connection analyzer 328 may obtain an upload throughput by transmitting one or more predefined sets of data with known size to a networked device (such as authentication server 130). In this implementation, the network connection analyzer 328 may transmit a predefined set of data to the networked device and determine a length of time it took for the set of data to reach the networked device (based on an acknowledgement receipt from the networked device). The network connection analyzer 328 may determine the throughput based on the size of the set of data and the length of time. Alternatively or additionally, the network connection analyzer 328 may receive the length of time and/or the throughput calculation from the networked device.

In some instances, the network connection analyzer 328 may obtain a download throughput using similar techniques as for an upload throughput, but instead of measuring transmission of a set of data from the user device 110 to the networked device, the user device 110 and/or networked device measures a set of data transmitted from the networked device to the user device 110. It should be noted that the upload throughput and/or the download throughput may be used as a network characteristic for the decision process described herein.

In some instances, the network connection analyzer 328 may obtain a current latency of the network connection available at the first time. In some instances, the latency may be obtained based on network performance information exchanged between the user device 110 and an access point (e.g., using control channels). In some instances, the network connection analyzer 328 may obtain the latency by transmitting or receiving one or more predefined sets of data with known size to a networked device (such as authentication server 130). In this implementation, the network connection analyzer 328 may transmit a predefined set of data to the networked device and determine a length of time it took for the set of data to reach the networked device (based on an acknowledgement receipt from the networked device). The network connection analyzer 328 may determine the latency based on the length of time. Alternatively or additionally, the network connection analyzer 328 may receive the length of time and/or the latency calculation from the networked device. In some instances, the length of time is used as a latency value.

It should be noted that more than one network connection may be "available" as described herein. In these instances, the network connection analyzer 328 may assess the characteristic of an available network connection currently being used to transmit data to or from the user device 110 over a network, such as network 102.

Decision Engine

In some implementations, a decision engine 330 may determine whether to transmit an image file and/or a hash file of the image file based on the one or more characteristics of an available network connection. For example, the decision engine 330 may obtain the one or more characteristics from the network connection analyzer 328 at a first time and determine that a hash file should be sent instead of the image file based on the one or more characteristics of a current network connection available at the first time. Upon transmission of the hash file, the decision engine 330 may periodically obtain characteristics of an available network connection at later times. For example, the decision engine 330 may obtain characteristics of an available network connection at a second time and determine that the image file may be sent.

Various examples of scenarios may cause the decision engine 330 to determine that the image file should be sent at the second time (but not at the first time). In one example, network conditions (e.g., quality) on the same type of network connection may have improved from the first time to the second time. In this example, the signal strength, dropped versus successful packet ratio, latency, throughput, and/or other quality metrics may have improved beyond a threshold quality level at the second time whereas such quality metrics were below the threshold quality level at the first time. In another example, a second type of network connection may have become available at the second time but was not available at the first time. The second type of network connection may be used to send image files while the first type of network connection may not. In this example, image files may be authorized to be sent while on a WiFi network but not while on a cellular network. A cellular network connection (but not a WiFi connection) may have been available at the first time, and a WiFi connection may have become available at the second time. In some instances, the decision logic of the foregoing examples may be dictated by the user-defined settings and/or the system rules.

In some instances, the system rules and/or user-defined settings may specify one or more threshold quality values. The threshold quality values may each correspond to a given type of network quality assessment. For instance, the following may be used as a predefined threshold quality value: a minimal signal strength indicator value may be used as a predefined threshold quality value (below which the decision engine 330 considers a "poor quality" connection and above which the decision engine 330 considers a "strong" connection), a predefined number dropped packets value (above which the decision engine 330 considers a "poor quality" connection and below which the decision engine 330 considers a "strong" connection), a ratio of received packets to dropped packets (below which the decision engine 330 considers a "poor quality" connection and above which the decision engine 330 considers a "strong" connection), a network latency value (below which the decision engine 330 considers a "poor quality" connection and above which the decision engine 330 considers a "strong" connection), a network throughput value (below which the decision engine 330 considers a "poor quality" connection and above which the decision engine 330 considers a "strong" connection), and/or other threshold values that can be used to assess a poor quality or strong network connection. In implementations that use a combination of one or more of the foregoing, the threshold value may be predefined to reflect a combination quality score. In each of the foregoing examples of threshold values, the decision engine 330 may determine whether or not a weak or strong connection exists based on whether the current network quality metric deviates from the threshold value (e.g., is above or below, depending on the threshold value used).

Based on the comparison of a current quality metric and a corresponding threshold value, the decision engine 330 may determine whether or not the image file or a hash file should be sent. For example, for "poor quality" network connections, the hash file and not the image file may be sent. For "strong" network connections, the image file may be sent.

Figure 4:
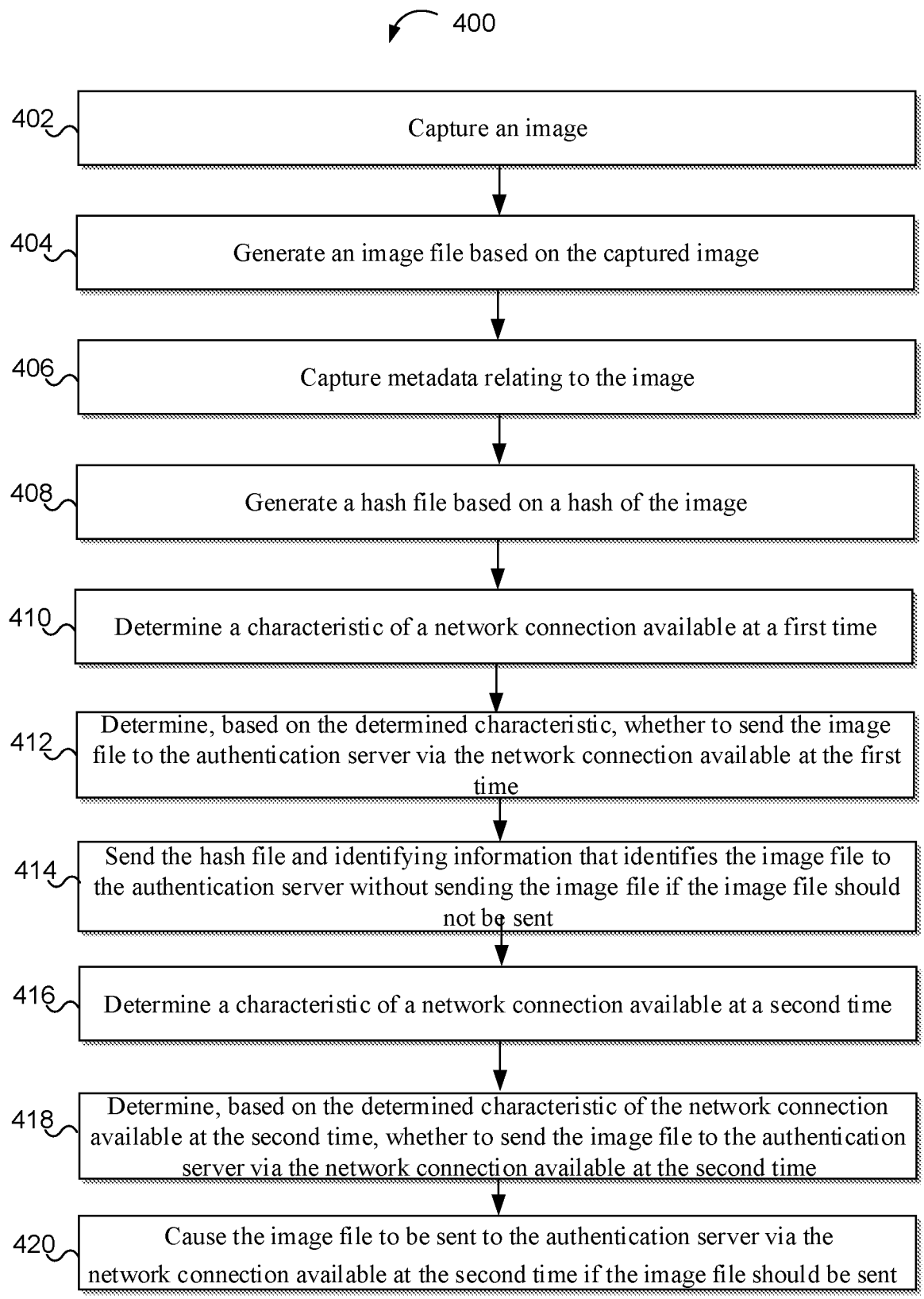
FIG. 4 illustrates a process of a device for authenticating image files, captured at the device, in conjunction with an authentication server, in accordance with an embodiment of the present disclosure.

FIG. 4 illustrates a process of a device for authenticating image files, captured at the device, in conjunction with an authentication server, in accordance with an embodiment of the present disclosure.

In an operation 402, process 400 may include capturing an image. For instance, the image authentication application 320 may capture an image via the electronic imaging device 302.

In an operation 404, process 400 may include generating an image file based on the captured image. For example, the image authentication application 320 may generate the image file by encoding image information from the electronic imaging device 302. The encoding format may include conventional still (e.g., JPEG, PNG, etc.), motion (MP4, MOV, etc.), or other appropriate encoding formats, which may depend on the type of image file being created.

In an operation 406, process 400 may include capturing metadata relating to the image. For example, the image authentication application 320 may obtain metadata such as location information (indicating a geographic location at which the image was captured) from the location device 306, date and time information (indicating a date and time at which the image was captured) from a date and time source (in some implementations, a source external to user device 110 such as an online date and time server or image authentication server 230), and/or other information relevant to the captured image.

In an operation 408, process 400 may include generating a hash file based on a hash of the image file. For example, the image authentication application 320 may generate a hash of the image file and generate a hash file based on the hash.

In an operation 410, process 400 may include determining a characteristic of a network connection available at a first time. For example, the image authentication application 320 may assess a type of the network connection available at the first time, a quality of the network connection available at the first time, and/or other characteristic of the network connection.

In an operation 412, process 400 may include determining, based on the determined characteristic of the network connection available at the first time, whether to send the image file to the authentication server via the network connection available at the first time. For example, the image authentication application 320 may obtain system rules and/or user-defined settings to determine whether to send the image file or the hash file based on the determined characteristic.

In an operation 414, process 400 may include in response to a determination that the image file should not be sent, sending the hash file and identifying information that identifies the image file to the authentication server via the network connection available at the first time without sending the image file. For example, the image authentication application 320 may determine that the network connection available at the first time is a cellular network connection and determine that the image file should not be sent over a cellular network connection (e.g., to reduce network usage via cellular networks). In another example, the image authentication application 320 may determine that the network connection available at the second time is of "low quality" based on quality threshold values and determine that the image file should not be sent over low quality network connections.

In an operation 416, process 400 may include determining a characteristic of a network connection available at a second time, subsequent to having sent the hash file and identifying information that identifies the image file to the authentication server. For example, the image authentication application 320 may periodically determine whether the image file can be sent at a later time after the hash file was sent (e.g., to determine whether a different type of network connection has become available and/or whether a network connection quality has improved).

In an operation 418, process 400 may include determining, based on the determined characteristic of the network connection available at the second time, whether to send the image file to the authentication server via the network connection available at the second time.

In an operation 420, process 400 may include in response to a determination that the image file should be sent via the network connection available at the second time, causing the image file to be sent to the authentication server via the network connection available at the second time. In this manner, the image authentication application 320 may send an image file at the time of image capture when the type of available network connection is authorized to be used to send image files and/or when the available network connection is of sufficient quality. If not, at the time of image capture, the image authentication application 320 may send a hash file instead.

It should be noted that if no network connection is available at a given time, the image authentication application 320 may not permit images to be captured for authentication. Alternatively, the image authentication application 320 may store the hash file (or encrypted version of the hash file) and/or the image file (or encrypted version of the image file) for later upload when a network connection is available.

Figure 5:
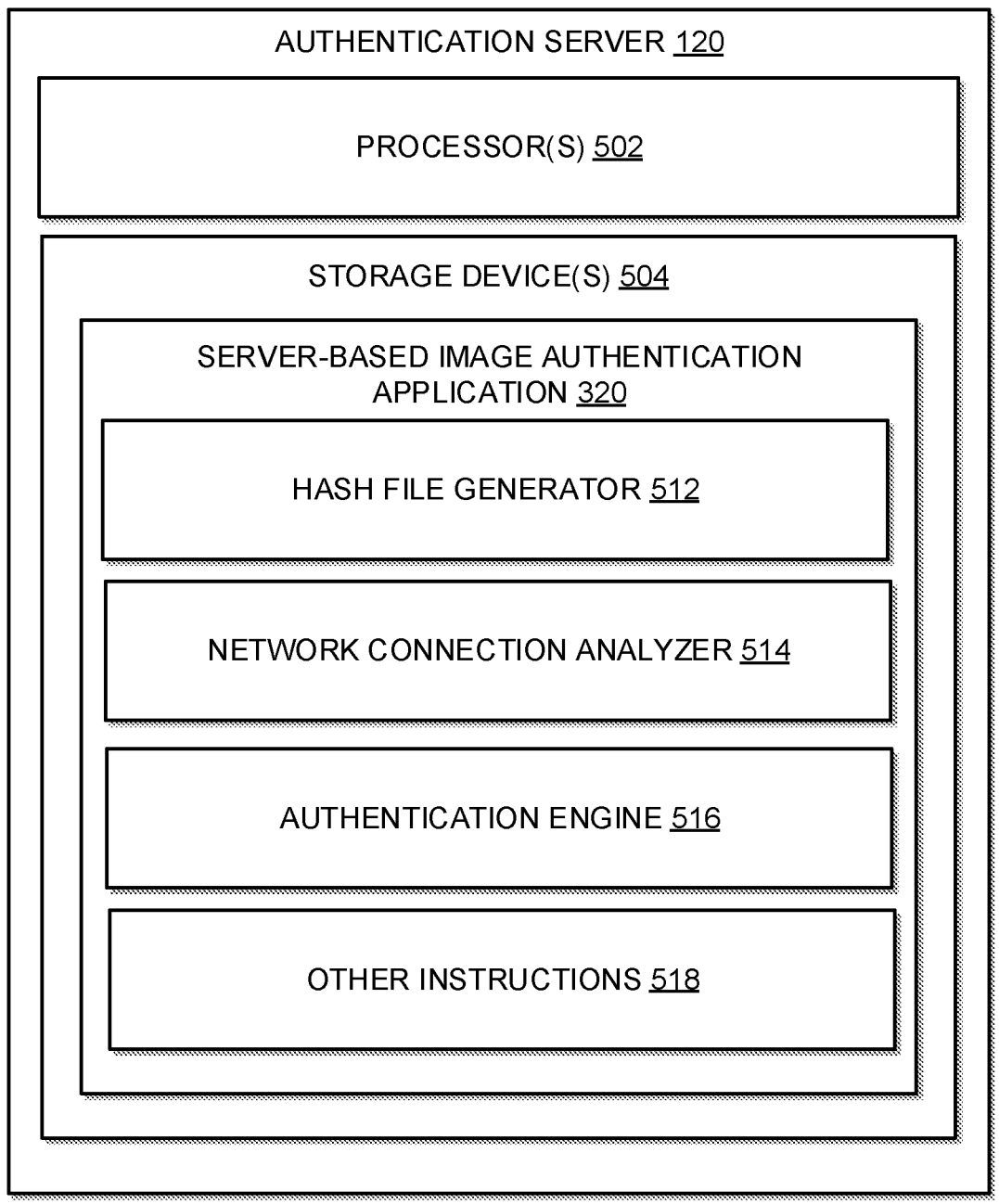
FIG. 5 illustrates an authentication server for authenticating images captured at and provided by a device, according to an implementation of the invention.

FIG. 5 illustrates an authentication server 120 for authenticating images captured at and provided by a user device 110, according to an implementation of the invention.

In some implementations, the authentication server 120 may process at least some or all of the time, geographic, and/or other restrictions assessed by the user device 110. For example, the authentication server 120 may receive, from the image authentication application 320, time, geolocation, and/or other information used to determine whether the user had sufficient time to alter an image file. Authentication server 120 may accordingly perform some or all of the assessments performed by the image authentication application 320 discussed with reference to FIG. 3. In such implementations, authentication server 120 may proceed to further authenticate an image file as described herein only when such assessments indicate that the user has not had sufficient time to alter the image file.

In some instances, the authentication server 120 may use the geographic information (e.g., coordinates) received from the user device 110 in various ways. For example, the image authentication application 320 may request the user to indicate the location the photograph was taken (e.g., an address or name of location), and transmit that information along with application-recorded coordinate information to the authentication server as part of the photographic image file. The authentication server 120 may then compare the recorded coordinate information with the address/point of interest information provided by the user to insure that the user has provided accurate geographic information. Alternatively, the authentication server 120 may take coordinate information provided by the image authentication application 320 to search for a corresponding address or nearby points of interest, and suggest these addresses/points of interest to the user. The user may be given the option to include geographic information with the authenticated image file or remove it, but is prohibited from modifying location information or adding unverifiable location information.

The authentication server 120 may create a resource location identifier associated with an authenticated image file and/or the watermarked image so that third party viewers can visit the URL and confirm that the image has been authenticated. The resource location identified may be a web address or a shortened web address to direct a third party viewer to a webpage where they can view the authenticated image and/or the watermarked image. A copy of the authenticated image and/or the watermarked image can be uploaded to the web address so that third party viewers can view the authenticated image and/or compare an image they have received with the authenticated image at the web address. The third party viewer may receive an allegedly authenticated image file from a user of the photographic data authentication system. The image file may include a watermark that indicates that the photograph has been authenticated. However, it is possible that the user has falsely applied the watermark to an unauthenticated and/or edited image file. To confirm that the image file has, in fact, been authenticated and has not been edited in any way, the third party viewer may visit the web address associated with the watermarked image. The web address may appear on the watermarked image itself (for example, may be part of the watermark), or may be provided by the sender of the image, or may be embedded in the image such that clicking on the watermarked image will lead the user directly to the web address. In certain embodiments, the web address may be the full address, or a representation of the address (e.g., a QR code, or a tinyURL, or a bitly address). By visiting the web address, the third party viewer can verify that the allegedly authenticated photograph has, in fact, been authenticated based on the functions described herein.

In some implementations, an authenticated image file may include authenticated metadata provided by the authentication server 120, such as a server-applied time stamp, date stamp, and geographic information. The authenticated image file may also include a resource location identifier associated with the authenticated image file. In certain embodiments, this resource location identifier may be a web address or a representation of a web address (e.g., bitly code, tinyURL, or QR code). In this scenario, the authenticated image file, or certain portions of the authenticated image file may be uploaded to a website viewable by third parties. The user can share the authenticated image file with third party viewers (block 145) to represent that the image being shared has not been edited or revised. Third party viewers can view the authenticated image file and access the web address to confirm that the image has been verified by the authentication server and has not been revised.

The authenticated image file may comprise any combination of an authenticated image (i.e., the original image once it has been verified by the authentication server), authenticated image metadata (e.g., authentication server-provided or authentication server-approved timestamp, datestamp, and geographic data), and/or a watermarked image, the watermarked image being the authenticated image with a visual watermark affixed to it to represent that it has been verified by the authentication server. Attention will now be turned to the various components the foregoing and other implementations.

Having described various implementations of whether or not a user has had time to alter an image file and results of authentication, attention will now be turned to various authentication server components 120 that facilitate these and other functions. Authentication server 120 may include one or more physical processors 502, one or more electronic storage devices 504, and/or other components.

In an implementation, the one or more processors 502 may be programmed by computer program instructions, such as those stored in the one or more electronic storage devices 504. For example, the one or more processors 502 may be programmed by, among other instructions, a server-based image authentication application 510 (also referred to interchangeably as server-based application 510 for convenience).

In an implementation, the server-based application 510 may include various instructions such as, without limitation, a hash file generator 512, a network connection analyzer 514, an authentication engine 516, and/or other instructions 518. As used herein, for convenience, the various instructions will be described as performing an operation, when, in fact, the various instructions program the processors 502 (and therefore authentication server 120) to perform the operation.

In an implementation, hash file generator 512 is the same as hash file generator 326 used by the image authentication application 320 illustrated in FIG. 3. This is so that a hash file of a given image file can be deterministically generated at both the authentication server 120 and the user device 110. In some implementations, various versions of hash file generators may be stored in a database, such as a database 160. To the extent that different versions of hash file generators are used at different devices 110 (e.g., different versions of image authentication applications use different hash file generators), database 160 may be used to retrieve an appropriate version or type of hash file generator. In these implementations, user device 110 may communicate information identifying the version or type of hash file generator used. Such information may be in the form of an image authentication application version, an identifier for the hash file generator, and/or other identifying information used by authentication server 120 to retrieve the appropriate hash file generator to use.

In an implementation, a network connection analyzer 514 may participate in network connection analysis and/or perform the functions of the network connection analyzer 328 used by the image authentication application 320 illustrated in FIG. 3. In this manner, the authentication server 120 and/or the user device 110 may assess the quality of a network connection via which the server 120 and user device 110 communicate.

In an implementation, the authentication engine 516 facilitates authentication of image files captured at devices 110 even if use of a network connection to send image files from the devices 110 to the authentication server 120 should be limited (e.g., to minimize cellular data plans and/or when the network connection is poor). For example, the authentication engine 516 may receive a hash file of an image file for an image captured at user device 110. Because the hash file is smaller in size than the image file, sending the hash file over a cellular connection or "poor" quality (as described herein) connection may be more efficient.

Figure 6:
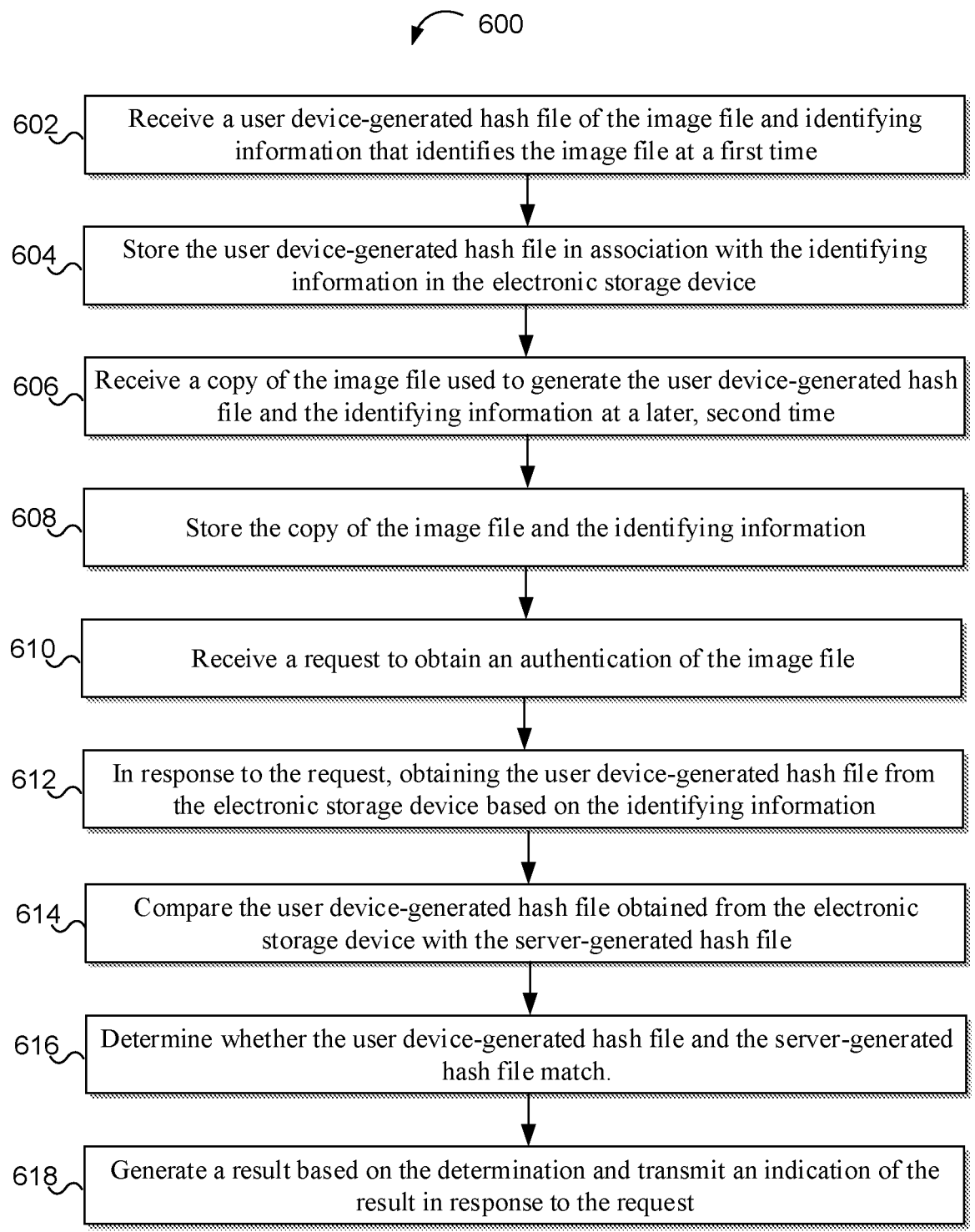
FIG. 6 illustrates a process of an authentication server for authenticating image files captured at a device in conjunction with an authentication server, according to an implementation of the invention.

To facilitate the foregoing, attention will now be turned to FIG. 6, which illustrates a process of an authentication server for authenticating image files captured at a device in conjunction with an authentication server, according to an implementation of the invention.

In an operation 602, process 600 may include receiving, from the user device via a network connection, a user device-generated hash file of the image file and identifying information that identifies the image file. For example, the server-based application 320 may receive a hash file of the image file and identifying information that identifies the image file.

In an operation 604, process 600 may include storing the user device-generated hash file in association with the identifying information in the electronic storage device. In some instances, the user device-generated hash file and the identifying information may be stored in association with one another in a database, such as database 160. To be stored in association with one another means that first information (such as a hash file) and second information (such as identifying information that identifies an image file) are stored such that one can be retrieved as output given the other as input. For example, a database link between two data fields may be used to store two (or more) pieces of information in association with one another. In another example, two or more pieces of information may be stored in association with one another as a key-value pair. Other ways to store information in association with one another may be used as well.

In an operation 606, process 600 may include receiving, from the user device, a copy of the image file that was used to generate the user device-generated hash file at the user device and the identifying information that identifies the image file. The copy of the image file may be received from the user device after the hash file was received from the user device. In some instances, the copy of the image file may be received via the same type of network connection used to receive the user device-generated hash file (in which case the quality of the network connection has improved since the user device-generated hash file was received) or via a different type of network connection used to receive the user device-generated hash file (in which case a different type of network connection has become available since the user device-generated hash file was received).

In an operation 608, process 600 may include storing the copy of the image file in association with the identifying information. In some instances, operation 608 may include generating a hash of the copy of the image file, generating a server-generated hash file based on the hash, and storing the hash file in association with the identifying information and/or the copy of the image file.

In an operation 610, process 600 may include receiving a request to obtain an authentication of the image file. The request may include the identifying information that identifies the image file.

In an operation 612, process 600 may include, in response to the request, obtaining the user device-generated hash file from the electronic storage device based on the identifying information. If the server-generated hash file was created in operation 608, operation 612 may include retrieving the server-generated hash file from the electronic storage device based on the identifying information. Otherwise, operation 612 may include retrieving the copy of the image file based on the identifying information and generating a server-generated hash file based on the retrieved copy of the image file.

In an operation 614, process 600 may include comparing the user device-generated hash file obtained from the electronic storage device with the server-generated hash file.

In an operation 616, process 600 may include determining whether the user device-generated hash file and the server-generated hash file match. A non-match indicates that the copy of the image file from which the server-generated hash was generated has been altered relative to the copy of the image file from which the user device-generated hash file was generated. On the other hand, a match indicates that the copy of the image file from which the server-generated hash was generated has been unaltered relative to the image file from which the user device-generated hash file was generated.

In an operation 618, process 600 may include generating a result based on the determination of whether the user device-generated hash file and the server-generated hash file match, and transmitting an indication of the result in response to the request.

In some implementations, instead of or in addition to receiving a copy of the image file from the device that sent the hash file, a copy of the image file may be received from a third party requester (with whom the device shared the copy of the image file). In this manner, the third party requester may upload a copy of an image file and the identifying information for authenticating the copy of the image file. In these instances, process 600 may include generating a server-generated hash file based on the copy of the image file uploaded by the third party requester and compare the server-generated hash file to the user device-generated hash file. Upon a match, process 600 may provide an indication of authentication to the third party requester (upon a non-match provide an indication of potential tampering). Such indication may include metadata or other information available to the system regarding the identifying information (including a copy of the image file from the device if such copy is available).

It should readily be appreciated that authenticated images can be beneficial and useful in many different applications. By way of example, authenticated images can be used by dating websites, social networks, casting directors, and the like to ensure accurate and recent images of users. Parents may use authenticated images to verify the whereabouts and activities of their children or employers the whereabouts of their employees. Social media users can share experiences and users can view friends' images with full faith that the image is an accurate representation of their activities. Delivery services can provide reliable package tracking and location information. Customers making online purchases or reservations can verify the condition of the item they are purchasing or the item/property/vehicle they are renting. News outlets can verify source image information. Witnesses to a crime or accident can provide reliable, verifiable images taken at the scene. These are but a few of the myriad of uses that are possible with authenticated images.

Although illustrated in FIG. 1 as a single component, computer system 110 and end user device 140 may each include a plurality of individual components (e.g., computer devices) each programmed with at least some of the functions described herein. In this manner, some components of computer system 110 and/or end user device 140 may perform some functions while other components may perform other functions, as would be appreciated. The one or more processors 112 may each include one or more physical processors that are programmed by computer program instructions. The various instructions described herein are exemplary only. Other configurations and numbers of instructions may be used, so long as the processor(s) 112 are programmed to perform the functions described herein.

Furthermore, it should be appreciated that although the various instructions are illustrated in FIGS. 1, 3, and 5 as being co-located within a single processing unit, in implementations in which processor(s) 312, 502 include multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 312, 502 may be programmed by one or more additional instructions that may perform some or all of the functionality attributed herein to one of the instructions.

The various instructions described herein may be stored in a storage device 314, 504, which may comprise random access memory (RAM), read only memory (ROM), and/or other memory. The storage device may store the computer program instructions (e.g., the aforementioned instructions) to be executed by processor 312, 502 as well as data that may be manipulated by processor 312, 502. The electronic storage device may comprise floppy disks, hard disks, optical disks, tapes, or other storage media for storing computer-executable instructions and/or data.

The various databases 160 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

The various components illustrated in FIG. 1 may be coupled to at least one other component via the network 102, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing Figures, different numbers of entities than those depicted may be used. Furthermore, according to various implementations, the components described herein may be implemented in hardware and/or software that configure hardware.

The various processing operations and/or data flows depicted in FIG. 2 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

Although the disclosure has been presented with reference only to the presently preferred embodiments, those of ordinary skill in the art will appreciate that various modifications can be made without departing from this disclosure. As such, the disclosure is defined only by the following claims and recited limitations.

What is claimed is:

1. A user device for capturing an image to be authenticated in conjunction with an authentication server accessible to the user device via a network communication, the user device comprising:
one or more physical processors; and
electronic storage configured to store computer program instructions that, when executed by the one or more physical processors, configure the one or more physical processors to:
store one or more predefined rules that control interaction between the user device and the authentication server, the one or more rules specifying one or more conditions that must be satisfied to send image files to the authentication server;
capture an image;
generate an image file based on the captured image;
generate a hash file based on a hash of the image file;
determine a characteristic of a network connection;
determine whether the one or more conditions specified by the one or more predefined rules have been satisfied based on the determined characteristic of the network connection; and
responsive to a determination that the one or more conditions have been satisfied, cause the image file, the hash file, and/or identifying information that identifies the image file to be sent to the authentication server via the network connection.

2. The user device of claim 1, wherein the characteristic of the network connection comprises the characteristic of the network connection at a first time, wherein based on the characteristic of the network connection at the first time, one or more of the image file, the hash file, and the identifying information are not sent based on a determination that at least one condition has not been satisfied based on the network connection at a first time, and wherein the one or more physical processors are further configured to:
determine a characteristic of a network connection at a second time;
determine whether the one or more conditions specified by the one or more predefined rules have been satisfied based on the determined characteristic of the network connection at the second time; and
responsive to a determination that the one or more conditions have been satisfied based on the determined characteristic of the network connection at the second time, cause the image file, the hash file, and/or identifying information that were not previously sent to be sent to the authentication server via the network connection at the second time.

3. The user device of claim 2, wherein the determined characteristic of the network connection at the first time comprises a first type of network connection, and wherein to determine, based on the determined characteristic of the network connection at the first time, whether the one or more conditions specified by the one or more predefined rules have been satisfied, the computer program instructions further configure the one or more physical processors to:
obtain a rule of the one or more predefined rules that specifies that image files should be sent only when one or more types of network connections are available;
determine that the first type of network connection is not among the one or more types of network connections.

4. The user device of claim 3, wherein the determined characteristic of the network connection at the second time comprises a second type of network connection different from the first type of network connection, and wherein to determine, based on the determined characteristic of the network connection at the second time, whether the one or more conditions specified by the one or more predefined rules have been satisfied based on the determined characteristic of the network connection at the second time, the computer program instructions further configure the one or more physical processors to:
determine that the second type of the network connection is among the one or more types of network connections.

5. The user device of claim 4, wherein the first type of network connection comprises a cellular connection provided by a wireless service plan provider and the second type of network connection comprises a Wireless Fidelity ("WiFi") connection.

6. The user device of claim 4, wherein the determined characteristic of the network connection at the second time comprises the first type of network connection, and wherein to determine, based on the determined characteristic of the network connection at the second time, whether the one or more conditions specified by the one or more predefined rules have been satisfied based on the determined characteristic of the network connection at the second time, the computer program instructions further configure the one or more physical processors to:
determine that the predefined setting has changed to permit the image file to be sent via the type of the network connection at the first time.

7. The user device of claim 2, wherein to determine, based on the determined characteristic of the network connection at the first time, whether the one or more conditions specified by the one or more predefined rules have been satisfied, the computer program instructions further configure the one or more physical processors to:
determine a quality of the network connection at the first time; and
determine that the quality of the network connection at the first time deviates from a threshold quality by at least a predefined amount, wherein a determination that the image file should not be sent is made in response to the determination that the quality deviates from the threshold quality by at least the predefined amount.

8. The user device of claim 7, wherein the quality of the network connection at the first time comprises an indication of network throughput via the network connection at the first time, and wherein to determine the quality of the network connection at the first time, the computer program instructions further configure the one or more physical processors to:
transmit one or more test datasets each having a known size to the authentication server via the network connection at the first time; and
determine, based on the transmission of the one or more test datasets, the current throughput of the network connection at the first time.

9. The user device of claim 7, wherein the quality of the network connection at the first time comprises an indication of an network error rate at the first time, and wherein to determine the quality of the network connection at the first time, the computer program instructions further configure the one or more physical processors to:
transmit a plurality of datasets each identified by an identifier to the authentication server via the network connection; and
determine the current error rate of the network connection at the first time based on a ratio of successfully transmitted datasets of the plurality of datasets to unsuccessfully transmitted datasets of the plurality of datasets.

10. The user device of claim 7, wherein to determine, based on the determined characteristic of the network connection at the second time, whether the one or more conditions specified by the one or more predefined rules have been satisfied based on the determined characteristic of the network connection at the second time, the computer program instructions further configure the one or more physical processors to:

determine a quality of the network connection at the second time; and determine that the quality of the network connection at the second time does not deviate from the threshold quality by at least the predefined amount, wherein a determination that the image file should be sent via the network connection at the second time is made in response to the determination that the quality of the network connection at the second time does not deviate from the threshold quality by at least the predefined amount.

11. The user device of claim 1, wherein the user device further comprises:

a camera device configured to capture the image;

wherein the computer program instructions include an image authentication application separate from a native camera application of the user device that, when executed by the one or more processors, configures the one or more processors to:

operate the camera device to capture the image;

obtain metadata related to the image; and transmit the metadata for authenticating the image file to the authentication server along with the hash file and the identifying information.

12. The user device of claim 10, wherein the user device further comprises:

a location device configured to determine a current location of the user device;

wherein to obtain the metadata, the image authentication application further configures the one or more processors to:

obtain, from the location device, location information that indicates the current location of the user device at a time the image was captured by the camera device via the image authentication application.

13. The user device of claim 11, wherein to obtain the metadata, the image authentication application further configures the one or more processors to:

obtain date and time information that indicates a date and the time at which the image was captured.

14. The user device of claim 1, wherein the hash of the image file is generated using a one-way hash function.

15. The user device of claim 1, wherein the one-way hash function comprises a SHA-256 hash function or a SHA-512 hash function.

16. A system for authenticating image files generated at user devices, the system comprising:

a user device and a networked authentication server, wherein the user device is configured by computer program instructions to:

store one or more predefined rules that control interaction between the user device and the authentication server, the one or more rules specifying one or more conditions that must be satisfied to send image files to the authentication server;

capture an image;

generate an image file based on the captured image;

generate a hash file based on a hash of the image file;

determine a characteristic of a network connection;

determine whether the one or more conditions specified by the one or more predefined rules have been satisfied based on the determined characteristic of the network connection; and responsive to a determination that the one or more conditions have been satisfied, cause the image file, the hash file, and/or identifying information that identifies the image file to be sent to the authentication server via the network connection, wherein the networked authentication server is configured by computer program instructions to:

receive, from the user device via the network connection, the user device-generated hash file based on the image file and identifying information that identifies the image file;

store the user device-generated hash file in association with the identifying information;

receive, from the user device, a copy of the image file that was used to generate the user device-generated hash file at the user device and the identifying information that identifies the image file;

store the copy of the image file in association with the identifying information;

receive a request to obtain an authentication of the image file, the request including the identifying information;

in response to the request, obtain the stored user device-generated hash file and the copy of the image file based on the identifying information;

generate a server-generated hash file based on the copy of the image file using the hash function;

compare the user device-generated hash file with the server-generated hash file;

determine whether the user device-generated hash file and the server-generated hash file match, wherein a non-match indicates that the copy of the image file from which the server-generated hash file was generated has been altered relative to the image file from which the user device-generated hash file was generated and wherein a match indicates that the copy of the image file has been unaltered relative to the image file;

generate a result based on the determination of whether the user device-generated hash file and the server-generated hash file match; and transmit an indication of the result in response to the request to authenticate the image file.

17. The system of claim 16, wherein the networked authentication server is further programmed to:

receive the copy of the image file and the identifying information from the user device via the network connection after the hash is received from the user device and before the request to verify whether the image file has been altered is received; and store the copy of the image file in association with the identifying information, wherein the copy of the image file is obtained in response to the request.

18. The system of claim 16, wherein the networked authentication server is further programmed to:
   receive the copy of the image file and the identifying information from the user device via a second network connection, which is a different type of network connection than the network connection, after the hash is received from the user device and before the request to verify whether the image file has been altered is received; and
   store the copy of the image file in association with the identifying information, wherein the copy of the image file is obtained in response to the request.

19. The system of claim 16, wherein the networked authentication server is further programmed to:
   receive the copy of the image file from an originator of the request.

20. The system of claim 16, wherein the networked authentication server is further programmed to:
   receive from the user device an indication of a first date and/or time at which the image file was generated;
   determine a second date and/or time at which the hash file was received from the user device;
   determine a time elapsed from the first date and/or time that the image file was generated received and the second date and/or time that the hash file was received; and
   determine whether the time elapsed exceeds a threshold value, wherein the result is based on whether or not the time elapsed exceeds the threshold value.

21. The system of claim 16, wherein the networked authentication server is further programmed to:
   receive from the user device an indication of a first geolocation at which the image file was generated;
   receive from the user device an indication of a second geolocation at which the hash file was sent;
   determine a distance between the first geolocation and the second geolocation; and
   determine whether the distance exceeds a threshold distance value, wherein the result is based on whether or not the distance exceeds the threshold distance value.

22. The system of claim 16, wherein the networked authentication server is further programmed to:
   receive from the user device an indication of a first date and/or time at which the image file was generated;
   determine a second date and/or time at which the hash file was received from the user device;
   determine a time elapsed from the first date and/or time that the image file was generated received and the second date and/or time that the hash file was received;
   determine whether the time elapsed exceeds a threshold value, wherein the result is based on whether or not the time elapsed exceeds the threshold value;
   receive from the user device an indication of a first geolocation at which the image file was generated;
   receive from the user device an indication of a second geolocation at which the hash file was sent;
   determine a distance between the first geolocation and the second geolocation; and
   determine whether the distance exceeds a threshold distance value, wherein the result is based on whether or not the distance exceeds the threshold distance value.

\* \* \* \* \*